T867019

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED OCTOBER 28, 1969

867 O.G. 1095

818,419

REVERSAL SYSTEM CONTAINING A PYRIDYLIDENE RHODANINE DYE

Robert C. Taber, Kodak Park Division, Rochester, N.Y. 14650

Filed Apr. 22, 1969. Published Oct. 28, 1969
Int. Cl. G03c *5/50, 5/30, 1/48*
U.S. Cl. 96—59
No Drawing. 9 Pages Specification

Processing an exposed photographic element in a reversal system employing chemical development and physical development in one element in the presence of a pyridylidene rhodanine dye provides desired lower positive minimum density and improved image tone. A pyridylidene rhodanine dye, such as 3-ethyl-5-[(1-(4-sulfobutyl)-4(1H)-pyridylidene)] rhodanine sodium salt, 3-ethyl-5-(1-ethyl-4(1H)pyridylidene)rhodanine and/or 3-ethyl-5-(1-beta-hydroxyethyl-4(1H)-pyridylidene) rhodanine in a monobath and/or in a photographic element containing a photographic silver halide emulsion and development nuclei provides the described improved properties.